(12) United States Patent
Kim et al.

(10) Patent No.: US 7,874,224 B2
(45) Date of Patent: Jan. 25, 2011

(54) TRANSMISSION FOR TRACTOR

(75) Inventors: Hyo-jung Kim, Gyeonggi-do (KR);
Hyung-tai Kim, Gyeonggi-do (KR);
Sang-heon Lee, Gyeonggi-do (KR)

(73) Assignee: LS Mtron Ltd., Gyeonggi-Do (KR)

( * ) Notice: Subject to any disclaimer, the term of this patent is extended or adjusted under 35 U.S.C. 154(b) by 548 days.

(21) Appl. No.: 12/068,997

(22) Filed: Feb. 14, 2008

(65) Prior Publication Data
US 2008/0282823 A1 Nov. 20, 2008

(30) Foreign Application Priority Data
May 17, 2007 (KR) .................. 10-2007-0048066

(51) Int. Cl.
*F16H 3/093* (2006.01)
(52) U.S. Cl. .......................................... 74/331
(58) Field of Classification Search .............. 74/325, 74/329, 331
See application file for complete search history.

(56) References Cited

U.S. PATENT DOCUMENTS

| 6,241,066 B1 * | 6/2001 | Asada et al. ............ 192/3.63 |
| 2007/0068294 A1 * | 3/2007 | Buck et al. ............ 74/325 |

FOREIGN PATENT DOCUMENTS

GB 917113 A 1/1963

KR 10-2006-0092873 A 8/2006

OTHER PUBLICATIONS

European Search Report issued in European Patent Application No. EP 08 00 2435 dated Dec. 30, 2008.

* cited by examiner

*Primary Examiner*—Sherry L Estremsky
*Assistant Examiner*—Edwin A. Young
(74) *Attorney, Agent, or Firm*—McDerott Will & Emery LLP

(57) ABSTRACT

A transmission for a tractor has an input shaft receiving power from an engine, an idle shaft disposed parallel with the input shaft, an output shaft disposed parallel with the idle shaft and transmitting power to a main transmission part, forward/reverse driving gears installed on the input shaft so as to rotate idle, a forward/reverse clutch installed between the forward driving gear and the reverse driving gear to selectively connect the forward driving gear or the reverse driving gear to the input shaft, a forward driven gear installed on the idle shaft and engaged with the forward driving gear, a reverse driven gear installed on the idle shaft and engaged with the reverse driving gear, high speed/low speed driving gears installed between the forward driven gear and the reverse driven gear so as to rotate idle, a high speed/low speed clutch installed between the high speed driving gear and the low speed driving gear to selectively connect the high speed driving gear or the low speed driving gear to the idle shaft, and high speed/low speed driven gears installed on the output shaft and engaged with the high speed driving gear and the low speed driving gear, respectively.

2 Claims, 7 Drawing Sheets

TRANSMISSION FOR TRACTOR

CROSS-REFERENCE TO RELATED APPLICATION

This application claims all benefits of Korean Patent Application No. 10-2007-0048066 filed on May 17, 2007 in the Korean Intellectual Property Office, the disclosures of which are incorporated herein by reference.

BACKGROUND OF THE INVENTION

1. Field of the Invention

The present invention relates to a transmission for a tractor, and more particularly to a transmission for a tractor in which a high speed/low speed transmission part and a forward/reverse transmission part are integrated with each other, making the structure thereof simple and compact.

2. Description of the Prior Art

Generally, a transmission for a tractor is formed in type of a series of transmission parts that are connected in order from an engine. That is, the transmission generally includes a forward/reverse transmission part that changes a direction of rotating power of the engine to a forward/reverse direction, a main transmission part that changes speed in four-stage at an output side of the forward/reverse transmission part, and a sub transmission part that changes speed in two to four-stage at an output side of the main transmission part. The sub transmission part generally consists of a high speed/low speed transmission unit that is capable of selecting one from two-stage speed of high speed and low speed, and a super low speed transmission unit that reduces the speed of the output from the high speed/low speed transmission unit once more. The transmission includes a power take-off (PTO) transmission part that draws power for driving an attachment installed on a rear side of the tractor.

In connection with such a transmission, Korean Patent Application Publication No. 10-2006-0092873 has disclosed a power shift type transmission in which the transmission device of the main transmission part is automated using a hydraulic clutch instead of a conventional synchromesh unit.

FIG. 7 shows the whole structure of the transmission disclosed in that publication. As shown in FIG. 7, the transmission includes a forward/reverse transmission part 5, 6, a first main transmission part 10 (hereinafter, referred to as 'a main transmission part'), a second main transmission part 11 (hereinafter, referred to as 'a high speed/low speed transmission part'), and a sub transmission part 12 (hereinafter, referred to as 'a super low speed transmission part'), which are arranged in a row (straight) to obtain forward 16-stage speed and reverse 16-stage speed. In the forward/reverse transmission part 5, 6, the main transmission part 10, and the high speed/low speed transmission part 11, the hydraulic clutches 5 and 6, 21 to 24, and 26 and 27 are respectively employed.

In such a transmission, although the power shift type by the hydraulic clutches is introduced for convenience of transmission, all gears from the forward/reverse transmission part to the super low speed transmission part are arranged longitudinally in a single row, i.e., in forward and reverse directions, so that a problem is caused in that a length of the transmission is lengthened excessively. For example, as the length of the transmission is lengthened, a distance between a front wheel and a rear wheel becomes far away to problematically increase a minimum turning radius as well as power consumption of the engine due to increased weight of the transmission.

SUMMARY OF THE INVENTION

Accordingly, the present invention has been made to solve the above-mentioned problems occurring in the prior art, and an object of the present invention is to provide a transmission for a tractor in which a high speed/low speed transmission part and a forward/reverse transmission part are integrated with each other so that the whole length is shortened, and a transmission shaft of the forward/reverse transmission part is also utilized as a driving shaft for high speed/low speed transmission, thereby making the structure thereof simple and compact in size.

In accordance with an aspect of the present invention, there is provided a transmission for a tractor having: an input shaft receiving power from an engine; an idle shaft disposed parallel with the input shaft; an output shaft disposed parallel with the idle shaft and transmitting power to a main transmission part; forward/reverse driving gears installed on the input shaft so as to rotate idle; a forward/reverse clutch installed between the forward driving gear and the reverse driving gear to selectively connect the forward driving gear or the reverse driving gear to the input shaft; a forward driven gear installed on the idle shaft and engaged with the forward driving gear; a reverse driven gear installed on the idle shaft and engaged with the reverse driving gear; high speed/low speed driving gears installed between the forward driven gear and the reverse driven gear so as to rotate idle; a high speed/low speed clutch installed between the high speed driving gear and the low speed driving gear to selectively connect the high speed driving gear or the low speed driving gear to the idle shaft; and high speed/low speed driven gears installed on the output shaft and engaged with the high speed driving gear and the low speed driving gear, respectively.

In such a transmission, the operations of the forward/reverse clutch and the high speed/low speed clutch are carried out together so that the power from the input shaft is transmitted in forward/high speed, forward/low speed, reverse/high speed, and reverse/low speed to the main transmission part via the output shaft.

The clutches may be a hydraulic multiple disk clutch. According to this, the clutches can be driven with hydraulic force, so that the manipulation of the transmission becomes convenient as compared to the case where a device such as a synchronizer and a link-associated clutch are used, and a transmission lever is forced to operate manually, and that the structure of the transmission is simplified due to removal of a complicated link mechanism.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings.

Figure 1:
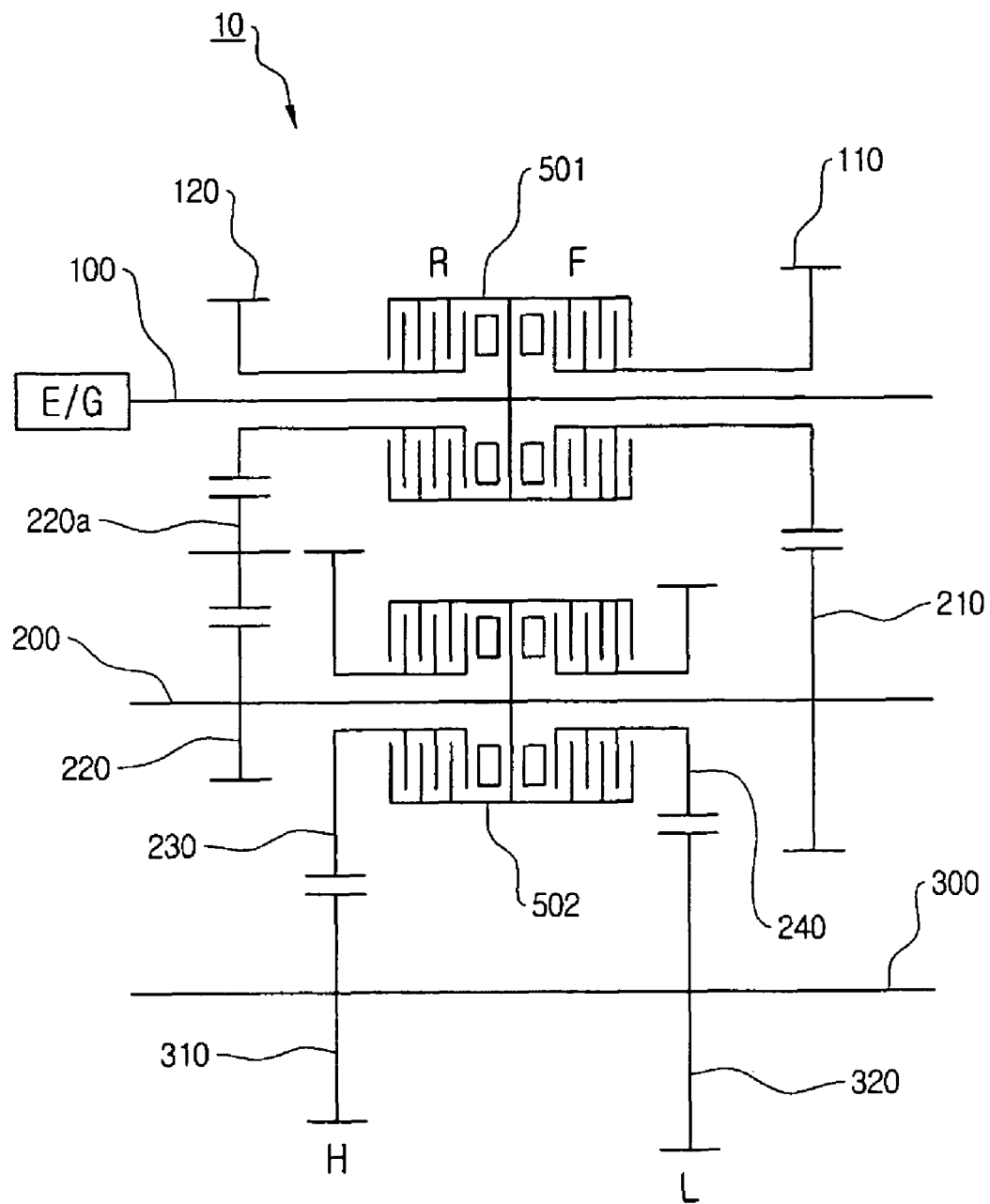
FIG. 1 is a schematic systematic diagram of a transmission for a tractor according to the present invention.

As shown in FIG. 1, the transmission includes an input shaft 100, an idle shaft 200, and an output shaft 300, which are arranged parallel with each other, such that a forward/reverse transmission part and a high speed/low speed transmission part are disposed in one region of a transmission case. The input shaft 100 serves to receive power from an engine, and the idle shaft 200 serves to mediate the forward/reverse movement and functions as a driving shaft for high speed/low speed transmission. The output shaft 300 receives the power from the idle shaft 200 and transmits it to the main transmission part (not shown).

A forward driving gear 110 and a reverse driving gear 120 are installed on the input shaft 100 such that they are able to rotate idle on the input shaft 100 through support by a bearing. A forward/reverse clutch 501 is installed between the forward driving gear 110 and the reverse driving gear 120 so as to selectively operate in a state of connecting the forward driving gear 110 and the input shaft 100, a neutral state, and a state of connecting the reverse driving gear 120 and the input shaft 100.

On the idle shaft 200, a forward driven gear 210 engaged with the forward driving gear 110 of the input shaft 100 and a reverse driven gear 220 engaged with the reverse driving gear 120 by way of an idle gear 220a are installed such that they are rotated together. Further, between the forward driven gear 210 and the reverse driven gear 220, a high speed driving gear 230 and a low speed driving gear 240 are installed such that they rotate idle on the idle gear 200. Further, between the high speed driving gear 230 and the low speed driving gear 240, a high speed/low speed clutch 502 is installed so as to selectively operate in a state of connecting the high speed driving gear 230 and the idle shaft 200, a neutral state, and a state of connecting the low speed driving gear 240 and the idle shaft 200.

On the output shaft 300, a high speed driven gear 310 and a low speed driven gear 320 are installed such that they are integrally rotated. The high speed driven gear 310 is engaged with the high speed driving gear 230 of the idle gear 200, and the low speed driven gear 320 is engaged with the low speed driving gear 240 of the idle shaft 200.

The operation (forward or reverse operation) of the forward/reverse clutch 501 and the operation (high or low speed operation) of the high speed/low speed clutch 502 are carried out together so that the power from the input shaft 100 is transmitted in forward/high speed, forward/low speed, reverse/high speed, and reverse/low speed to the main transmission part via the output shaft 300.

In the transmission, the forward/reverse transmission part and the high/low speed transmission part are integrally installed in a single region of a transmission case, so that the whole length thereof is shortened as compared to the prior art. Further, the transmission shaft of the forward/reverse transmission part comprises the idle shaft 200, and the clutches 501 and 502 are respectively installed on the input shaft 100 and the idle shaft 200, so that the idle shaft 200 also serves as a driving shaft for high/low speed transmission, thereby making the structure of the transmission simple and compact in size.

The forward/reverse clutch 501 and the high/low speed clutch 502 may comprise a known hydraulic multiple disk clutch. In such a construction, the clutch can be driven with hydraulic force, so that the manipulation of the transmission becomes convenient as compared to the case where a device such as a synchronizer and a link-associated clutch are used, and a transmission lever is forced to operate manually, and that the structure of the transmission is simplified due to removal of a complicated link mechanism. When the clutches 501 and 502 are used in a power shaft type hydraulic clutch, the length thereof is increased a little as compared to the case of using a synchronizer, but the length increment is merely slight relative to the length decrement obtained by arranging the forward/reverse transmission part and the high/low speed transmission part parallel with each other according to the present embodiment, so that the shortening effect of the whole length of the transmission is not greatly reduced.

Figure 2:
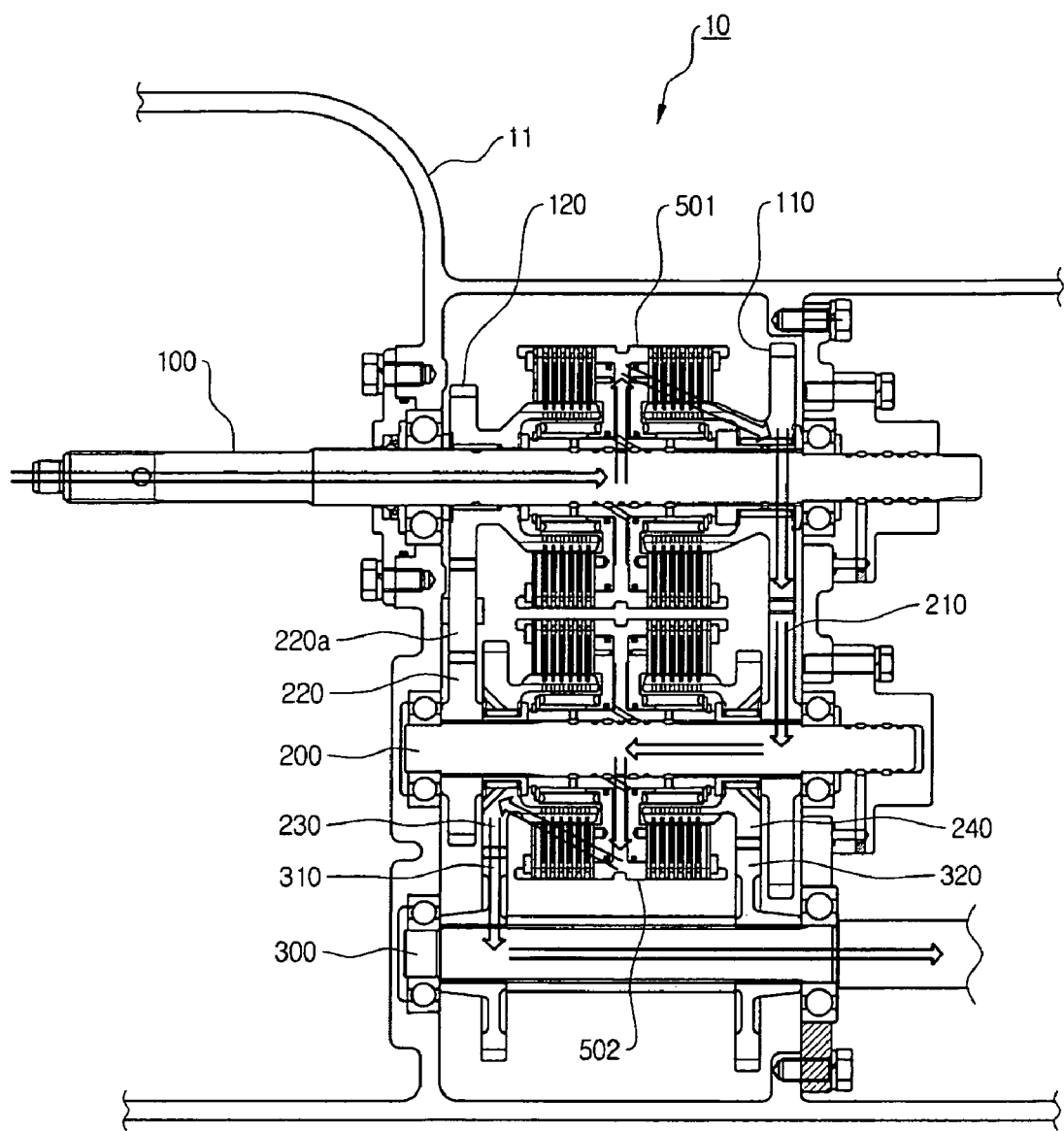
FIG. 2 is a sectional view of the transmission according to the present invention.

FIG. 2 is a sectional view illustrating the practical structure in which the forward/reverse transmission part and the high/low speed transmission part are combined as described with reference to FIG. 1. As shown in FIG. 2, and described before, the transmission 10 in which the forward/reverse transmission part and the high/low speed transmission part are combined is provided in such a way that the input shaft 100, the idle shaft 200, and the output shaft 300 are arranged parallel with each other in one region of a transmission case 11. On the input shaft 100, the forward driving gear 110, the reverse driving gear 120, and the forward/reverse clutch 501 are installed. On the idle shaft 200, the forward driven gear 210, the reverse driven gear 220, and the high/low speed clutch 502 are installed. On the output shaft 300, the high speed driven gear 310 and the reverse driven gear 320 are installed.

A transmission procedure will now be described in order with reference to FIGS. 3 to 6.

(Forward/High Speed Transmission)

Figure 3:
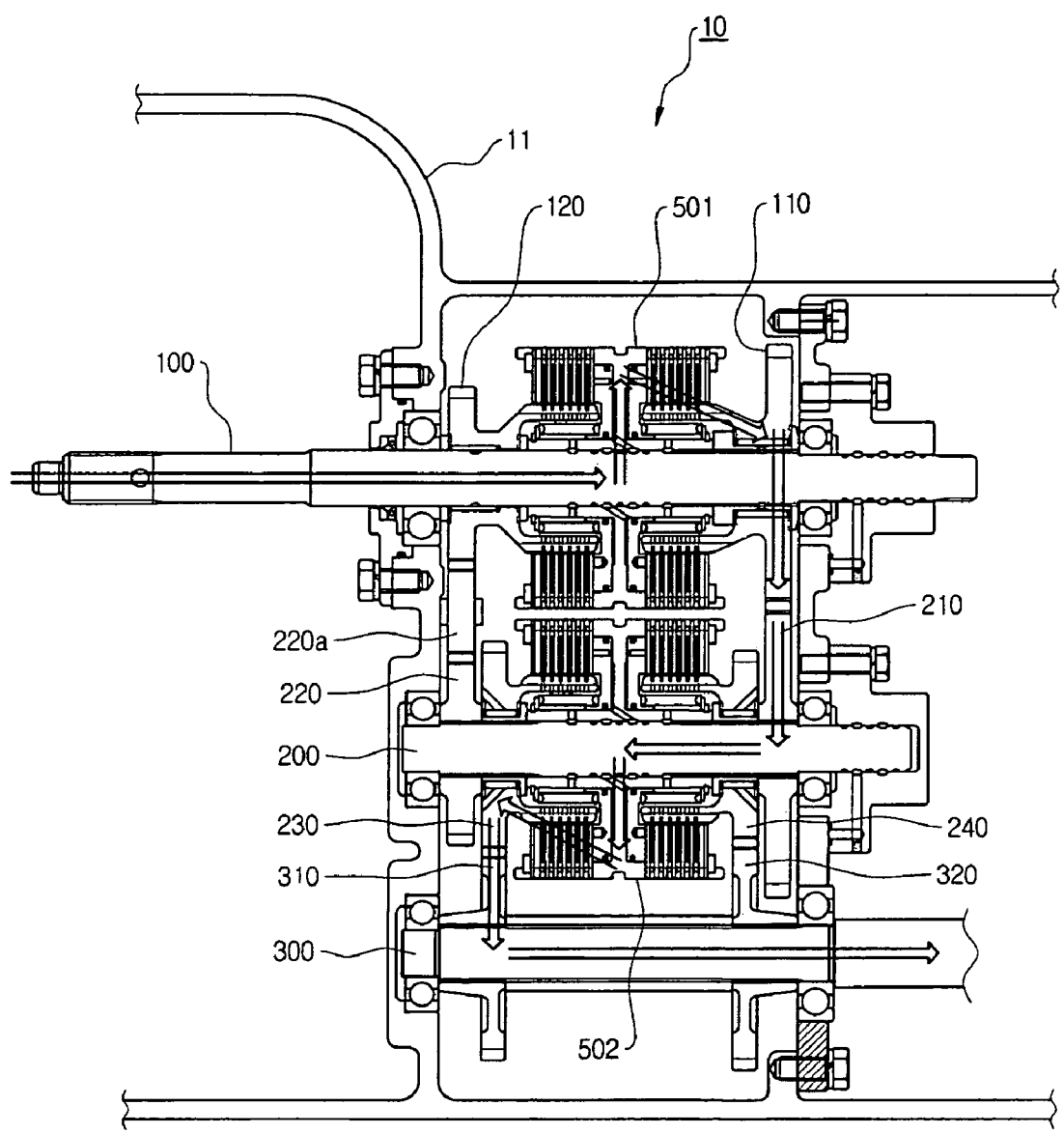
FIG. 3 is a sectional view illustrating the power flow of a first stage transmission in the transmission of FIG. 2.

As shown in FIG. 3, when a driver selects forward/high speed transmission, the forward/reverse clutch 501 connects the forward driving gear 110 and the input shaft 100 together, and the high/low speed clutch 502 connects the high speed driving gear 230 and the idle shaft 200 together. Thus, the power input from an engine to the input shaft 100 is transmitted to the output shaft 300 via the forward/reverse clutch 501, the forward driving gear 110, the forward driven gear 210, the idle shaft 200, the high/low speed clutch 502, the high speed driving gear 230, and the high speed driven gear 310 in order, and thus input to the main transmission.

(Forward/Low Speed Transmission)

Figure 4:
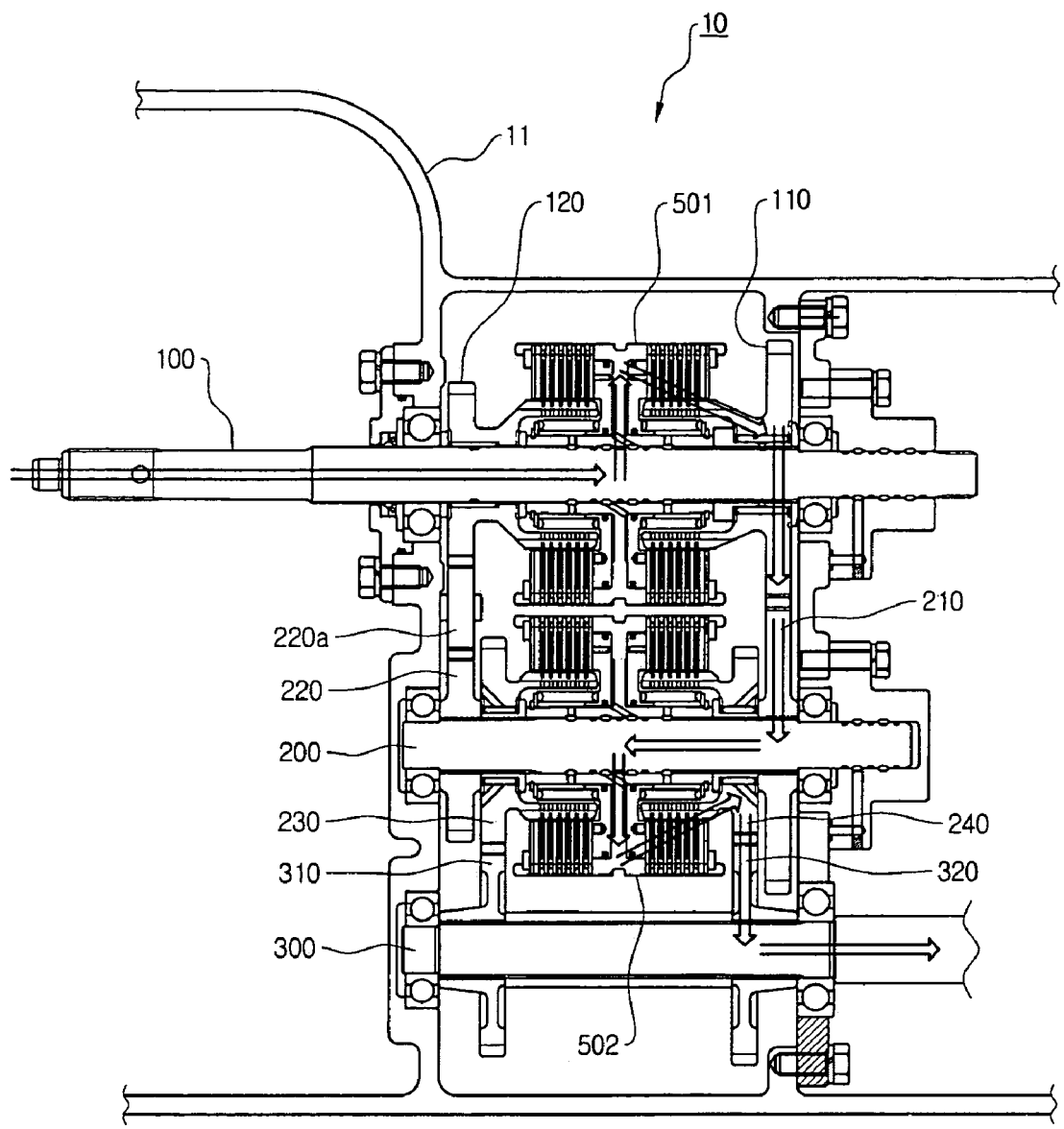
FIG. 4 is a sectional view illustrating the power flow of a second stage transmission in the transmission of FIG. 2.

As shown in FIG. 4, when a driver selects forward/low speed transmission, the forward/reverse clutch 501 connects the forward driving gear 110 and the input shaft 100 together, and the high/low speed clutch 502 connects the low speed driving gear 240 and the idle shaft 200 together. Thus, the power input from an engine to the input shaft 100 is transmitted to the output shaft 300 via the forward/reverse clutch 501, the forward driving gear 110, the forward driven gear 210, the idle shaft 200, the high/low speed clutch 502, the low speed driving gear 240, and the low speed driven gear 320 in order, and thus input to the main transmission.

(Reverse/High Speed Transmission)

Figure 5:
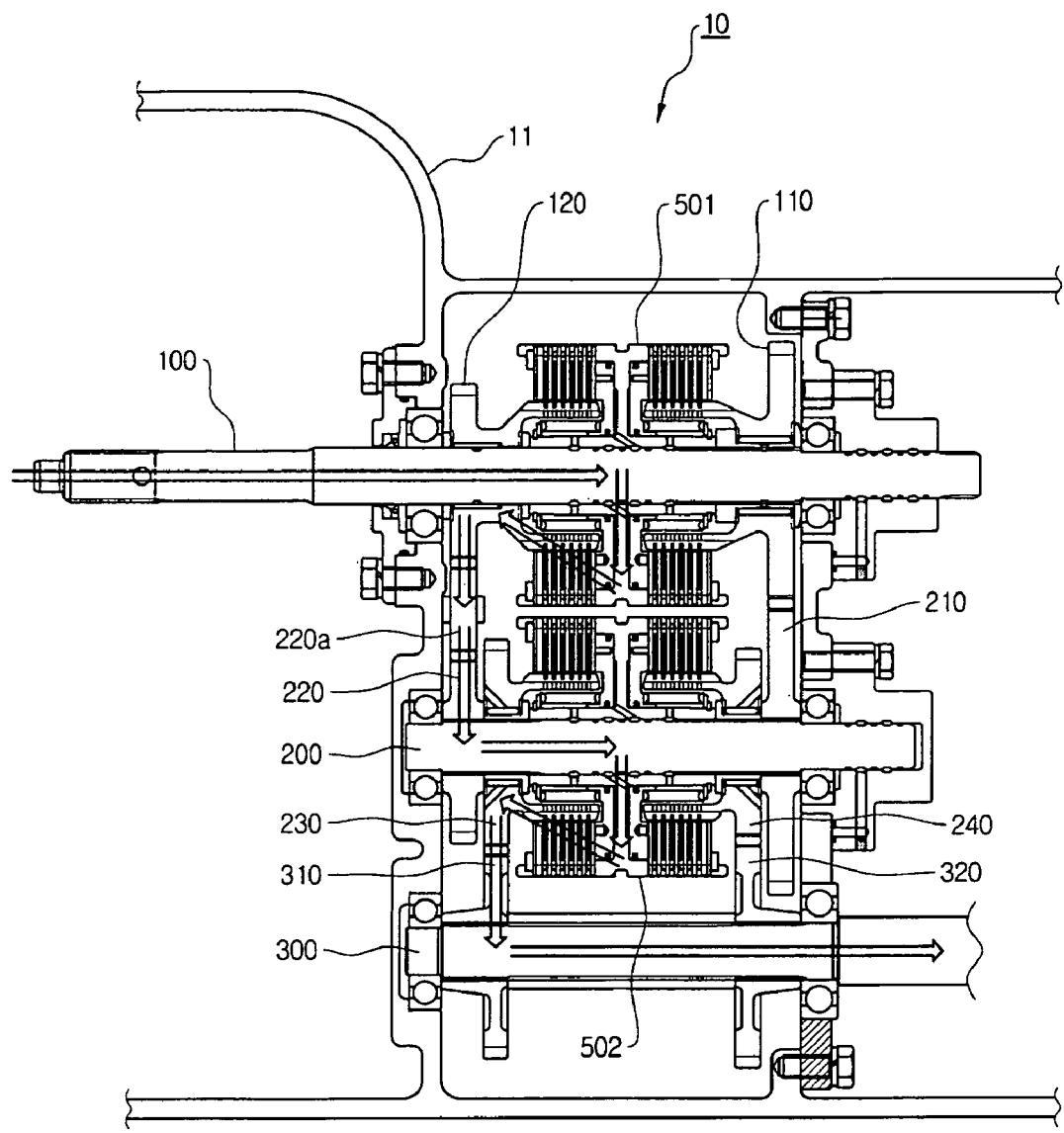
FIG. 5 is a sectional view illustrating the power flow of a third stage transmission in the transmission of FIG. 2.

As shown in FIG. 5, when a driver selects reverse/high speed transmission, the forward/reverse clutch 501 connects the reverse driving gear 120 and the input shaft 100 together, and the high/low speed clutch 502 connects the high speed driving gear 230 and the idle shaft 200 together. Thus, the power input from an engine to the input shaft 100 is transmit ted to the output shaft 300 via the forward/reverse clutch 501, the reverse driving gear 120, the idle gear 220a, the reverse driven gear 220, the idle shaft 200, the high/low speed clutch 502, the high speed driving gear 230, and the high speed driven gear 310 in order, and thus input to the main transmission.

(Reverse/Low Speed Transmission)

Figure 6:
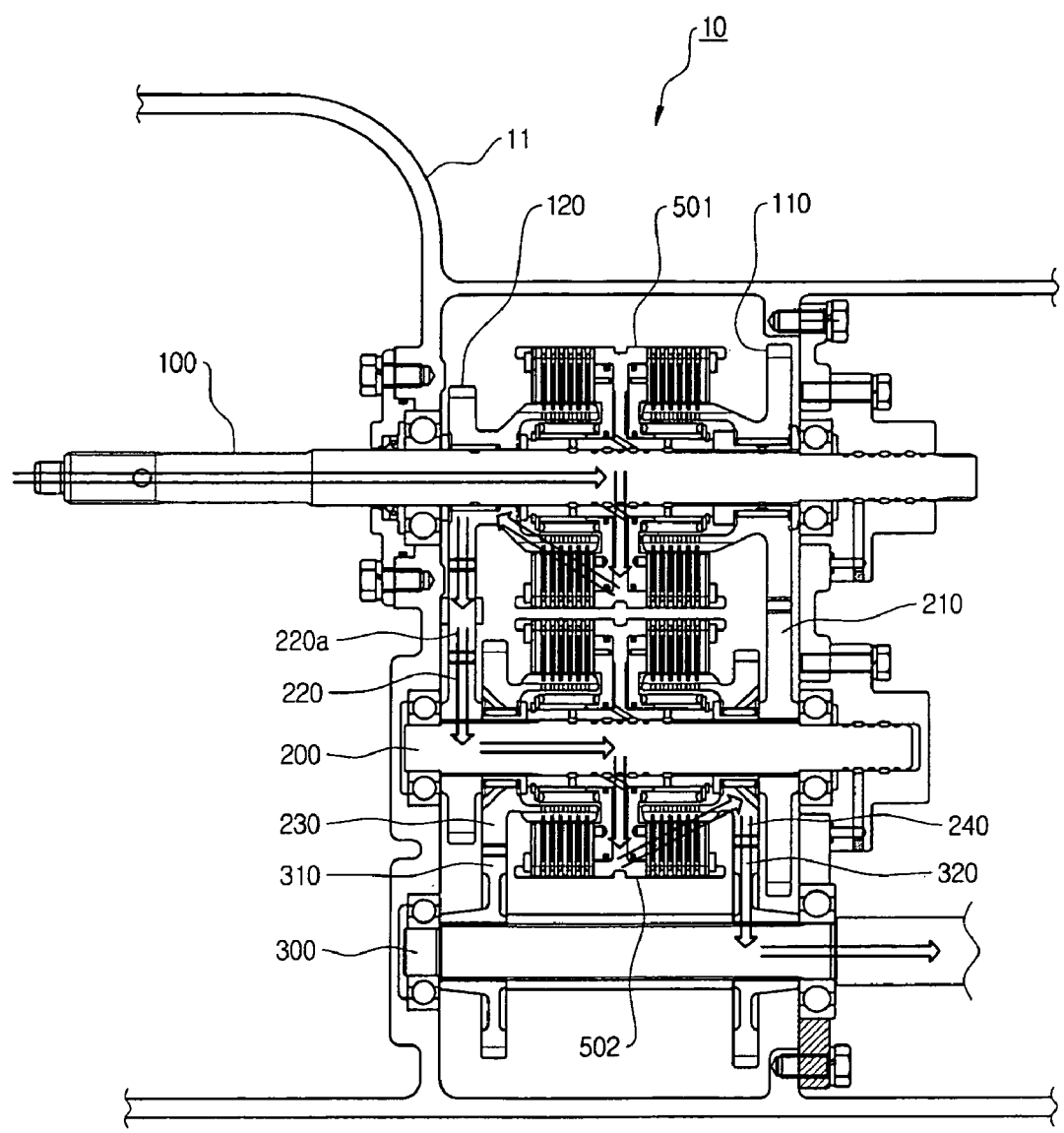
FIG. 6 is a sectional view illustrating the power flow of a fourth stage transmission in the transmission of FIG. 2.
Figure 7:
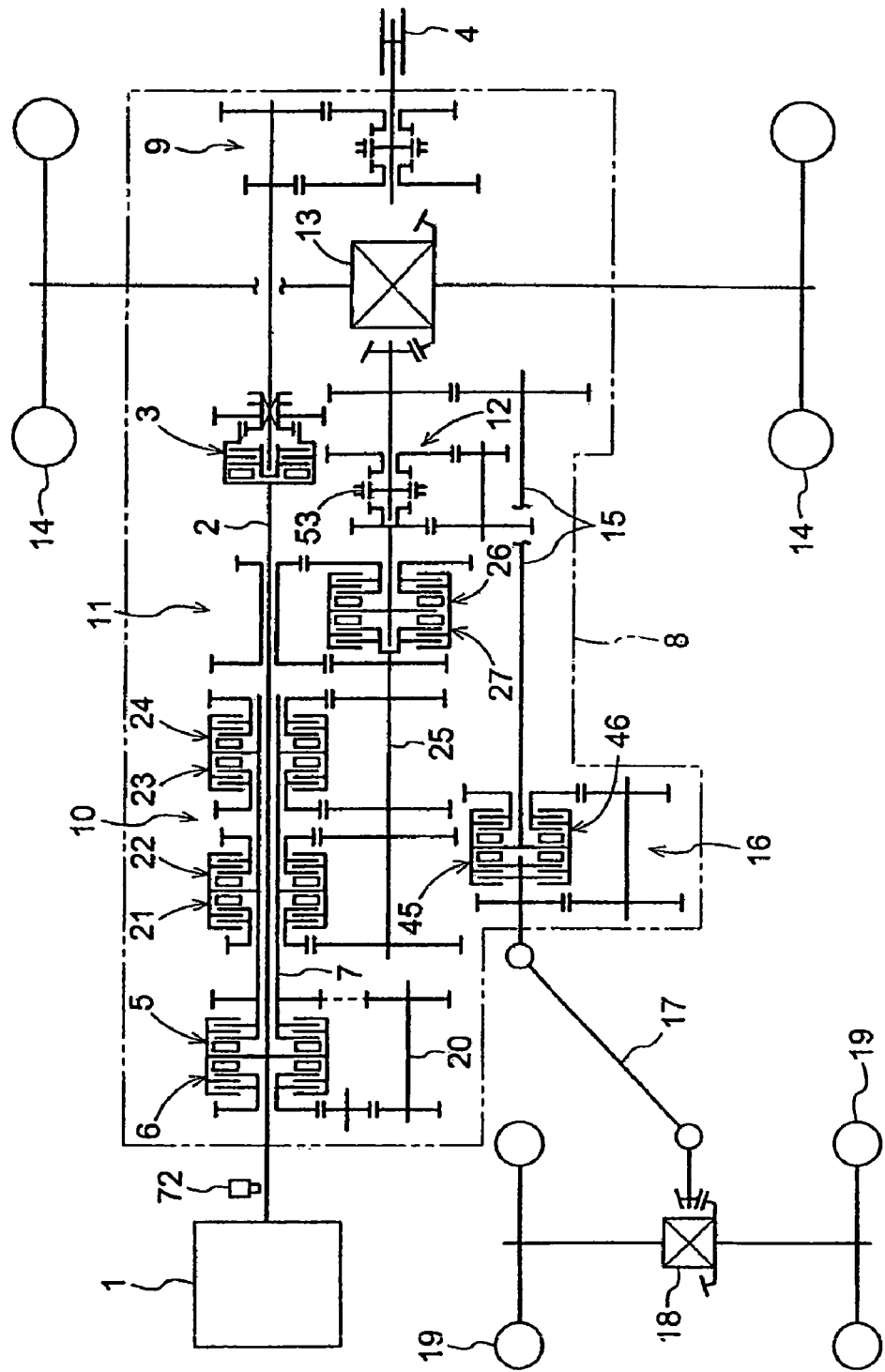
FIG. 7 is a systematic diagram of a transmission for a tractor according to the prior art.

As shown in FIG. 6, when a driver selects reverse/low speed transmission, the forward/reverse clutch 501 connects the reverse driving gear 120 and the input shaft 100 together, and the high/low speed clutch 502 connects the low speed driving gear 240 and the idle shaft 200 together. Thus, the power input from an engine to the input shaft 100 is transmitted to the output shaft 300 via the forward/reverse clutch 501, the reverse driving gear 120, the idle gear 220a, the reverse driven gear 220, the idle shaft 200, the high/low speed clutch 502, the low speed driving gear 240, and the low speed driven gear 320 in order, and thus input to the main transmission.

As set forth before, in the transmission, the forward/reverse transmission part and the high/low speed transmission part are integrally installed in a single region of a transmission case, so that the whole length thereof is shortened.

Further, the transmission shaft of the forward/reverse transmission part comprises the idle shaft, and the clutches for forward/reverse operation and high/low speed operation are respectively installed on the input shaft and the idle shaft, so that the idle shaft also serves as a driving shaft for high/low speed transmission, thereby making the structure of the transmission simple and compact in size.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A transmission for a tractor comprising:
an input shaft (100) receiving power from an engine;
an idle shaft (200) disposed parallel with the input shaft (100);
an output shaft (300) disposed parallel with the idle shaft (200) and transmitting power to a main transmission part;
forward/reverse driving gears (110 and 120) installed on the input shaft (100) so as to rotate idle;
a forward/reverse clutch (501) installed between the forward driving gear (110) and the reverse driving gear (120) to selectively connect the forward driving gear (110) or the reverse driving gear (120) to the input shaft (100);
a forward driven gear (210) installed on the idle shaft (200) and engaged with the forward driving gear (110);
a reverse driven gear (220) installed on the idle shaft (200) and engaged with the reverse driving gear (120);
high speed/low speed driving gears (230 and 240) installed between the forward driven gear (210) and the reverse driven gear (220) so as to rotate idle;
a high speed/low speed clutch (502) installed between the high speed driving gear (230) and the low speed driving gear (240) to selectively connect the high speed driving gear (230) or the low speed driving gear (240) to the idle shaft (200); and
high speed/low speed driven gears (310 and 320) installed on the output shaft (300) and engaged with the high speed driving gear (230) and the low speed driving gear (240), respectively.

2. The transmission according to claim 1, wherein the forward/reverse clutch (501) and high/low speed clutch (502) comprise a hydraulic multiple disk clutch.

* * * * *